United States Patent [19]

Riley

[11] Patent Number: 5,227,684

[45] Date of Patent: Jul. 13, 1993

[54] REVOLVING FIELD ELECTRIC MOTOR

[76] Inventor: Steven L. Riley, Rte. 1, Box 12A, Asbury, Mo. 64832

[21] Appl. No.: 808,729

[22] Filed: Dec. 17, 1991

[51] Int. Cl.⁵ .................. H02K 11/00; H02K 7/14; H02K 9/04

[52] U.S. Cl. .................. 310/67 R; 310/68 B; 310/62; 310/90; 318/254

[58] Field of Search ............... 310/1, 40 MM, 46, 62, 310/63, 67 R, 68 B, 90, 152; 318/138, 254

[56] References Cited

U.S. PATENT DOCUMENTS

| | | | |
|---|---|---|---|
| 3,348,111 | 10/1967 | Woehler | 318/252 |
| 3,383,574 | 5/1968 | Manteuffel | 318/138 |
| 3,914,629 | 10/1975 | Gardiner | 310/46 |
| 3,924,167 | 12/1975 | Clark et al. | 318/254 |
| 3,983,426 | 9/1976 | Kilmer | 310/46 |
| 4,283,664 | 8/1981 | Ebert | 318/138 |
| 4,292,575 | 9/1981 | Kuhnlein et al. | 318/254 |
| 4,357,563 | 11/1982 | Ohno | 318/254 |
| 4,431,953 | 2/1984 | Schray et al. | 318/254 |
| 4,458,167 | 7/1984 | Leveille | 310/46 |
| 4,459,087 | 7/1984 | Barge | 310/63 |
| 4,472,665 | 9/1984 | Tanikoshi | 318/254 |
| 4,874,975 | 10/1989 | Hertrich | 310/156 |
| 4,882,509 | 11/1989 | Wottlin | 310/46 |
| 4,949,022 | 8/1990 | Lipman | 310/63 |
| 4,968,913 | 11/1990 | Sakamoto | 310/68 B |
| 5,045,740 | 9/1991 | Hishinuma | 310/156 |
| 5,075,606 | 12/1991 | Lipman | 310/63 |

FOREIGN PATENT DOCUMENTS 0587435 11/1959 Canada ................... 310/1

Primary Examiner—Steven L. Stephan
Assistant Examiner—C. LaBalle
Attorney, Agent, or Firm—Jacobson, Price, Holman & Stern

[57] ABSTRACT

A revolving field electric motor including an armature attached to a shaft which armature is driven to rotate about the shaft, thus causing the shaft to turn. Permanent magnets are disposed on opposite ends of the armature. In place of field magnets of conventional motors which are energized all the time, individual electromagnets are evenly spaced around the perimeter of the circle inscribed by the armature. Opposing magnets are switched on only when the armature magnets approach, and are switched off as the armature magnet is attracted to and passes by the energized magnet.

2 Claims, 3 Drawing Sheets

REVOLVING FIELD ELECTRIC MOTOR

BACKGROUND OF THE INVENTION

The present invention relates to an electric motor, and more particularly to an electric motor driven by a switched revolving field.

Electric motors heretofore known operate under forces in magnetic fields, which fields are constantly generated, requiring a constant supply of current to drive the motor. A constant supply of current is not cost effective in certain circumstances. Consequently, it is desirable to minimize the current requirements of an electric motor. In addition, electric motors available today are designed with smaller diameter armatures, which reduces the size of the current supply, but also reduces the leverage of the motor.

SUMMARY OF THE INVENTION

It is a primary object of the present invention to provide an electric motor which operates with minimal current supply.

It is another object of the present invention to provide an electric motor which exhibits increased leverage with increased armature diameter, but still requires smaller amounts of electrical current.

It is still another object of the present invention to provide a motor having a unique shape and which employs the sequential switching of the individual field magnets thus making it possible to increase the diameter of the armature without increasing electrical energy at the input. The motor can, therefore, be lightweight, utilize plastics in its construction, and produce considerable torque while still being energy conservative.

Briefly, the present invention relates to a revolving field electric motor comprising an armature attached to a shaft. The armature is driven to rotate about the shaft, thus causing the shaft to turn. Permanent magnets are disposed on opposite ends of the armature. In place of field magnets of conventional motors which are energized all the time, individual electromagnets are evenly spaced around the perimeter of the circle inscribed by the armature. A plurality of switches are provided, one of each being connected between a corresponding electromagnet and ground, to complete a current path through the corresponding electromagnet, thus energizing the electromagnet. Each electromagnet is switched on only when the armature magnets approach, and are switched off as the armature is attracted to and passes the energized electromagnet.

Accordingly, by introducing a duty cycle to the magnetic forces which drive the motor armature, the amount of electrical energy required to drive the revolving field electric motor of the present invention is greatly reduced. Moreover, whereas increasing the armature diameter of conventional motors (to increase leverage) requires disproportionately greater amounts of electrical energy, increasing the armature size, and thus the leverage, of the motor according to the present invention can be achieved without increasing electrical energy at the input.

The above and other objects and advantages will become readily apparent when reference is made to the following description taken in conjunction with the accompanying drawings.

DETAILED DESCRIPTION OF THE DRAWINGS

Figure 1:
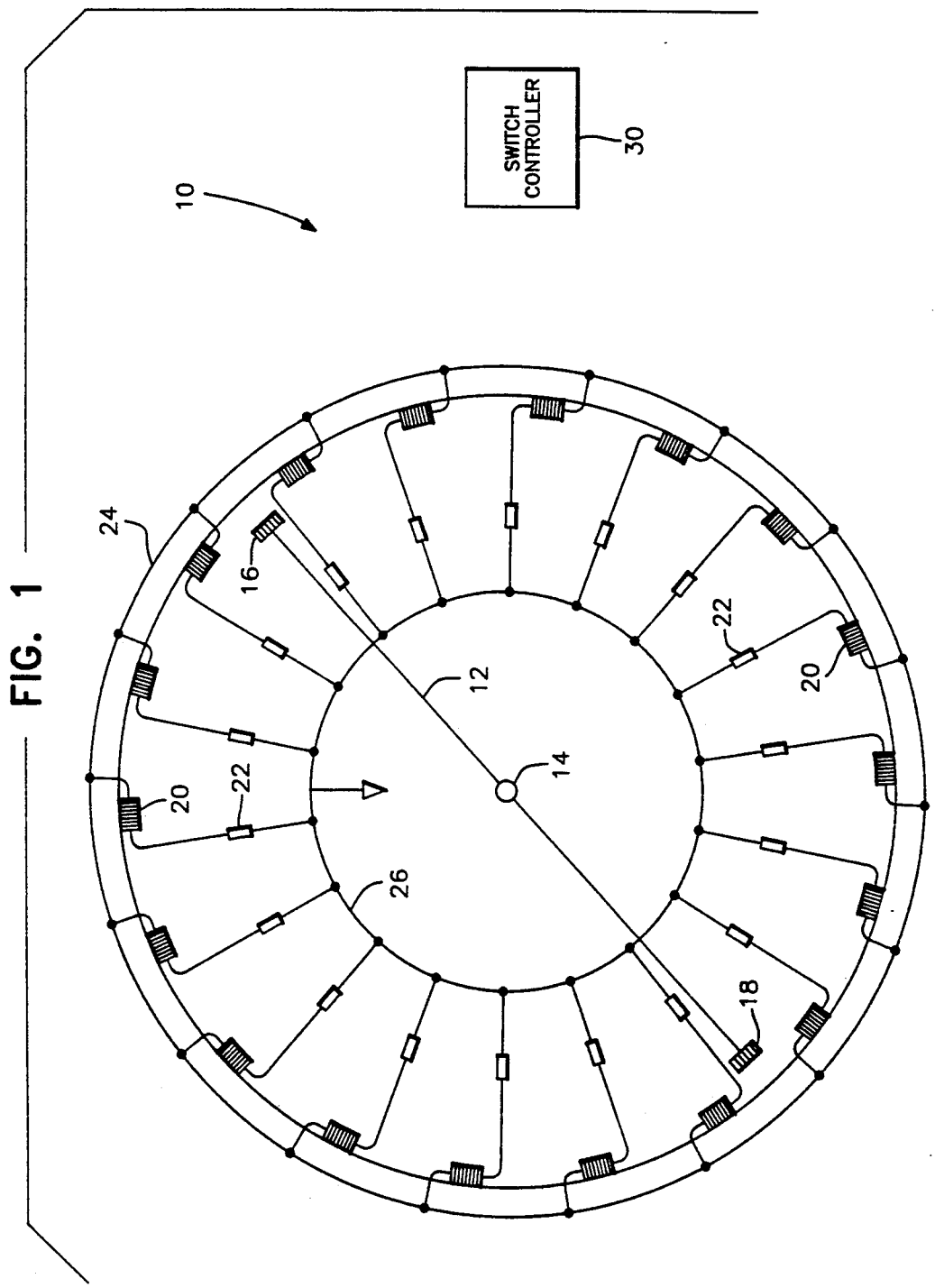
FIG. 1 is an end view of the revolving field electric motor according to the present invention.

FIG. 1 illustrates the revolving field electric motor, shown generally at 10. The motor 10 comprises an armature 12 attached to a shaft 14, which shaft is driven to turn by rotation of the armature 12. Permanent magnets 16 and 18 are provided at opposite ends of the armature 12.

A plurality of individual electromagnets 20 are provided around the perimeter of a circle inscribed by the armature 12. The electromagnets are evenly spaced from each other and are switched on and off by a corresponding one of a plurality of switches 22. In particular, a positive rail 24 circumscribes and connects to each of the electromagnets 20 and a negative rail (ground) 26 circumscribes the shaft 14. The switches 22 are connected between the associated electromagnets 20 and the ground 26, and open and close the path of current between the positive rail 24 and the ground 26, to selectively energize and deenergize the associated electromagnet 20. The switches 20 are controlled by a switch controller 30.

Generally, the motor 10 operates by energizing the electromagnets 20 in such a manner so as to attract the magnets 16 and 18 on the armature 12, thereby rotating the armature 12 and turning the shaft 14. Electromagnets proximate opposite ends of the armature 12 are switched on, only when the armature magnets 16 and 18 are near, and those electromagnets are deenergized as the armature 12 rotates and the magnets 16 and 18 pass. The next adjacent opposing electromagnets are then energized, and so forth. The net result is that only two electromagnets are energized at any one time, which reduces the amount of energy needed to produce a given horsepower. The timing and duration of the duty cycles for the individual electromagnets in relation to the position of the arm is critical.

Figure 2:
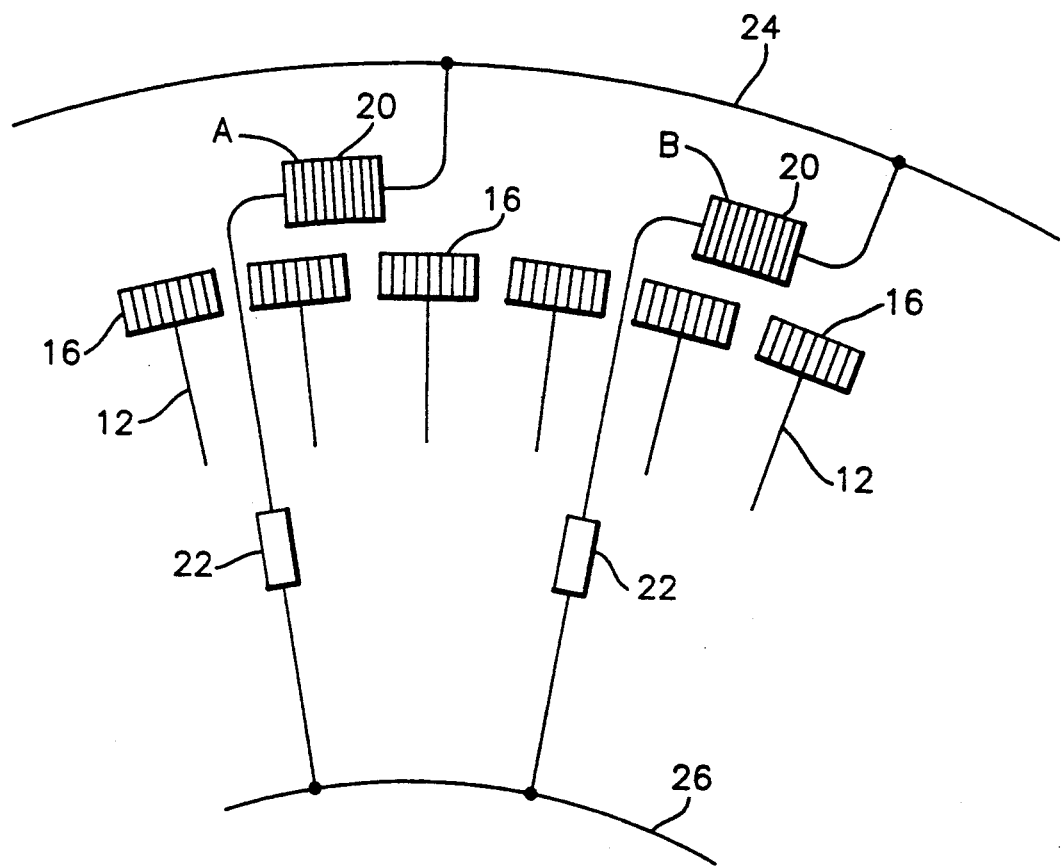
FIG. 2 is an enlarged end view of a portion of the revolving field electric motor.
Figure 3:
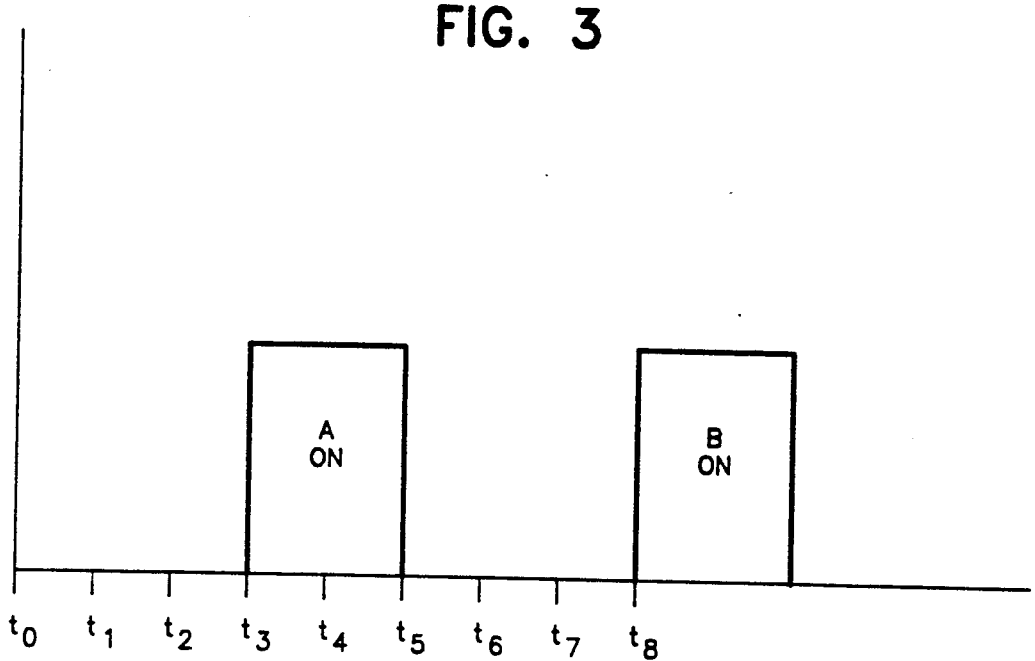
FIG. 3 is a timing diagram illustrating the duty cycle of the switch controller of the electric motor according to the present invention.

In this regard, the switch controller 30 generates switch control signals which control the electromagnets 20. With reference to FIGS. 2 and 3, the switch controller controls the field electromagnets 20 precisely in relation to the rotational position of the armature.

As shown in FIG. 2, electromagnets 20 designated A and B are energized at the proper instant of time relative to the position of the magnet 16 on the end of the armature 12, in a sequential manner. The timing and duration of the duty cycles for the individual electromagnets in relation to the position of the armature is critical, but this relation is self-regulating. Thus, if the armature attempts to get ahead of or behind the energized electromagnets, the magnetic field of each electromagnet would pull the armature back into proper position.

The motor according to the present invention may be operated in different ways to fit many different applications. For instance, the field magnets may be energized by switches either on the motor proper or they may be located remote from the motor. The switches may be controlled mechanically, optically, magnetically, from a solid state circuit board, or from an advanced method that is not available currently. Thus, the motor could be operated independently or as a slave motor controlled by a master controller.

As far as speed of rotation of the armature is concerned, the armature would simply follow the magnetic fields as the electromagnets are sequentially energized. The speed at which the switches and thus the magnets are energized would determine the speed of rotation of the armature around the central axis. The position of the armature could be sensed to more accurately control the speed at which the switches and thus the magnets are energized. This would depend solely on the design of the motor based on the application.

Figure 4:
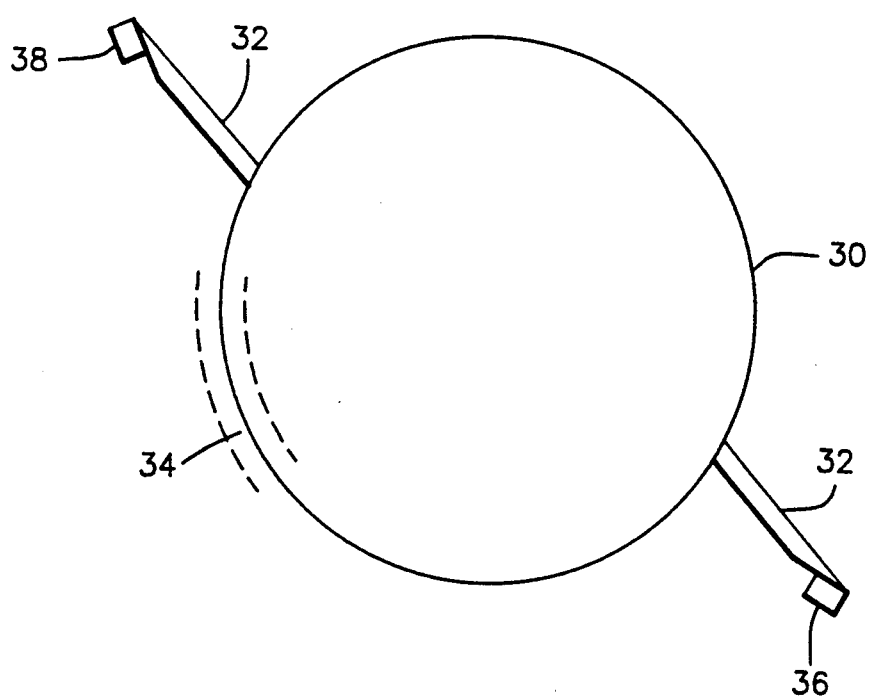
FIG. 4 illustrates a modification to the electric motor of the present invention, which modification embodies a shaftless motor.

The motor according to the present invention may be modified in several ways according to particular applications. For example, the configuration of the motor shown in FIG. 1 lends itself to be shaftless. Preferably, the motor diameter is large compared to the depth of the motor. Referring to FIG. 4, the armature could consist of a ring 30 having fan blades 32 mounted around the ring replacing the armature arms which would rotate within a race or track 34 and thus the center of the motor would be hollow. Permanent magnets 36 and 38 may be disposed on the tips of the fan blades.

Second, the permanent magnets on the armature arms need not be limited to two (on opposite ends). An equidistant pattern such as two, three, etc. would work as well and perhaps better for certain applications. The more field magnets energized would increase the torque produced but at the expense of decreasing the efficiency of the motor.

Third, each switch for the electromagnets may be positioned in any place in the circuit of that particular magnet. Thus, the switch may be between the positive rail and the magnet or between the magnet and the negative rail. The only consideration would be that a complete circuit be maintained when the switch is closed.

The foregoing description is intended by way of example only and is not intended to limit the present invention in any way except as set forth in the following claims.

I claim:
1. An electric motor comprising:
   rotating means for rotating about a central axis, said rotating means comprising a ring mounted within a track to rotate within said track and a plurality of elongated armature blades disposed symmetrically about said ring, each of said elongated armature blades being attached to the perimeter of said ring by a first end and extending radially outward from said ring to terminate at a distal tip, said ring and track defining the perimeter of an aperture formed coaxially with said central axis;
   a permanent magnet for each of said armature blades, said permanent magnet being mounted at the distal tip of each armature blade;
   a plurality of electromagnets arranged in a circular array symmetrically about said central axis;
   a positive rail connected to each of said plurality of electromagnets and circumferentially surrounding said circular array;
   a ground circumferentially surrounding said aperture and connected to each of said plurality of electromagnets;
   switching means for sequentially energizing the plurality of electromagnets, each of said switching means being electrically connected in series with one of said electromagnets, between said positive rail and said ground so as to complete a circuit when closed and open a circuit when open;
   switch control means for opening and closing said plurality of switches so as to energize said electromagnets in a sequential manner for causing said rotating means to rotate.
2. The electric motor of claim 1, wherein said rotating means comprises a plastic material which weighs less than permanently magnetic material.

* * * * *